United States Patent [19]

Bauer

[11] 4,186,817
[45] Feb. 5, 1980

[54] AIR INLET FOR ARMORED CAR

[76] Inventor: Russell E. Bauer, 920 Lakeshore Dr., Grosse Pointe Shores, Mich. 48236

[21] Appl. No.: 842,224

[22] Filed: Oct. 14, 1977

[51] Int. Cl.² .................. B60K 1/00; F41H 5/00; B60H 3/00; F01P 7/00
[52] U.S. Cl. ................. 180/54 A; 89/36 H; 165/44; 123/41.58
[58] Field of Search ............... 109/49.5; 180/54 A, 180/68 P; 89/36 H, 36 A; 165/41, 134, 44; 123/41.58, 41.70, 195 C, 198 E; 181/204

[56] References Cited

U.S. PATENT DOCUMENTS

| 2,236,461 | 3/1941 | Belaieff | 165/134 |
| 2,397,809 | 4/1946 | Roeder | 180/54 A |
| 3,504,644 | 4/1970 | Schibisch | 109/49.5 |
| 3,828,879 | 8/1974 | Harkey | 165/44 |

Primary Examiner—Charles J. Myhre
Assistant Examiner—Carl Stuart Miller
Attorney, Agent, or Firm—Hauke and Patalidis

[57] ABSTRACT

A radiator air inlet for an armored car providing unobstructed flow of cooling air to the radiator and armored plate protection for the radiator's relatively fragile structure. The air inlet system comprises a baffle disposed in front of the radiator and made of two plates of armor steel disposed generally at 90° to each other, and each disposed at 45° to the plane of the radiator. The two plates of armor steel each form one of the walls of an air induction manifold, one of which has an inlet directed at an angle upwardly and the other an inlet directed at an angle downwardly. Sheet metal panels and armored plate panels form the remaining walls of the pair of manifolds ducting cooling air onto the radiator, the sides of the air induction manifolds being made of armor plate panels.

9 Claims, 3 Drawing Figures

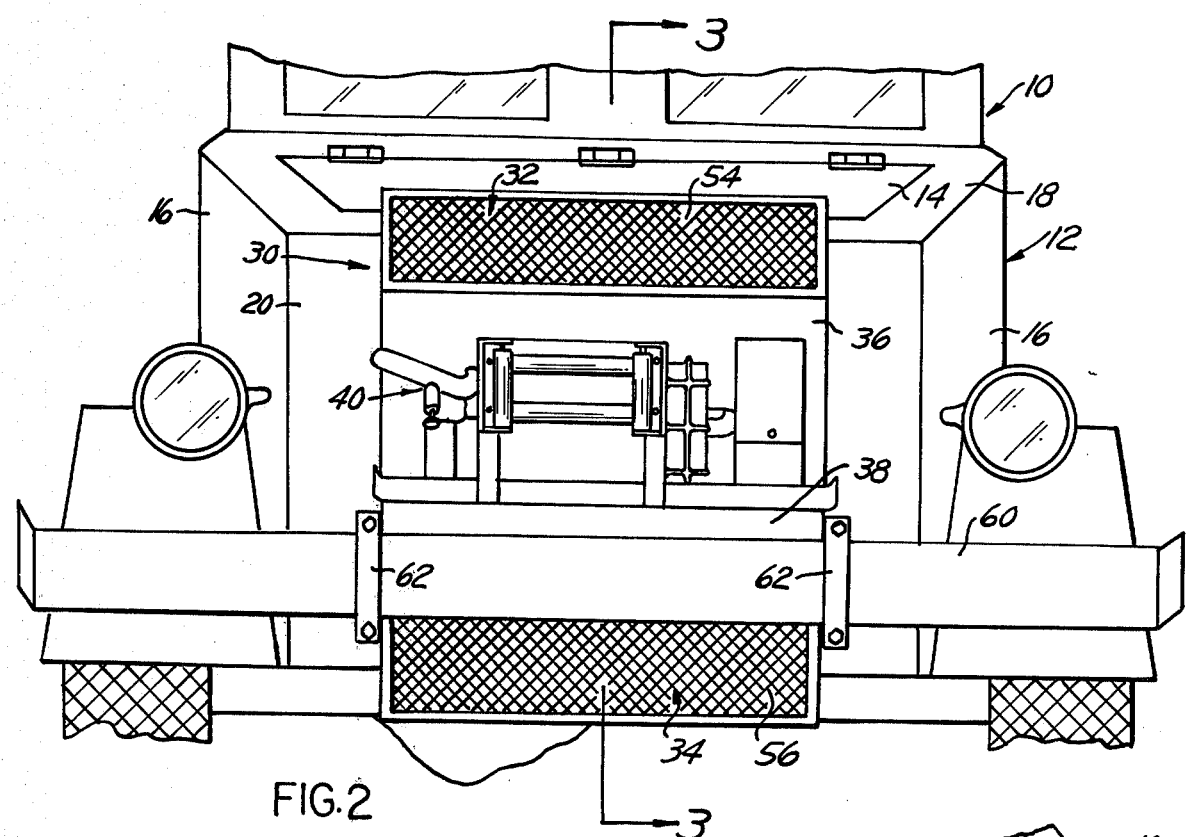
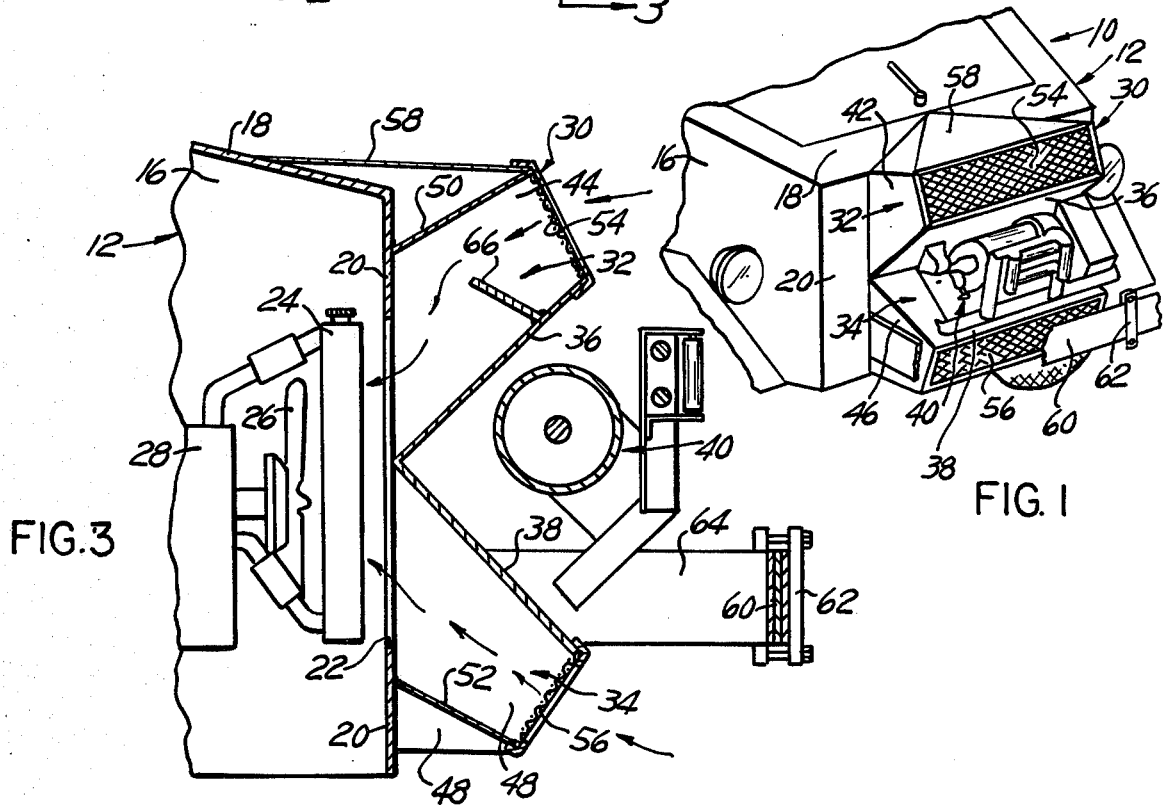

AIR INLET FOR ARMORED CAR

BACKGROUND OF THE INVENTION

The present invention relates to armored cars and other military vehicle in general and more particularly to a cooling air induction system for an armored car or military vehicle providing a shield protecting the radiator from direct hit but still permitting a substantial flow of cooling ambient air to reach the radiator core to insure efficient heat transfer between an engine coolant and the air.

One of the most vulnerable vital parts of military vehicles when subjected to enemy fire is the engine and more particularly the water and oil radiators, as loss of coolant fluid or lubricating oil results in putting the vehicle out of commission in a very short period of time. Radiators are particularly vulnerable to enemy fire because they are made of a honeycomb structure of very thin relatively soft metal providing a multitude of coolant fluid passageways and air core passageways affording a large heat exchange area surface between the coolant fluid or lubricating oil and the ambient air flowing through the air cores of the honeycomb structure. A single bullet hitting the radiator, or a simple steel rod manually ran through the honeycomb structure, causes a positive loss of fluid with resultant overheating of the engine, which rapidly causes shutdown of the engine and disablement of the vehicle.

Diverse radiator shielding arrangements have been proposed in the past. Such arrangements may take the form of a single plate shield placed in front of the radiator, which provides only limited protection and presents the inconvenience of hampering free flow of cooling air to the radiator cores. Attempts have been made to protect military vehicle radiators with a venetian blind like arrangement of steel slats remotely operated from the interior of the vehicle from a normally open position, to a partially closed or fully closed position under combat environment. However, when the radiator slats are partially or totally closed, full flow of cooling air to the radiator cores is considerably reduced or entirely eliminated, with the accompanying result of preventing free heat exchange between the coolant and the ambient air, causing in turn overheating of the engine.

The present invention remedies the inconvenience of the prior art by providing efficient shielding of a motor vehicle radiator against direct hit by projectiles, while still affording an unimpeded flow of cooling air through the radiator cores and into the engine compartment.

SUMMARY

The invention accomplishes its purposes and objects by way of an armor plate shield permanently mounted in front of a motor vehicle radiator, such shield forming the walls of a pair of converging air ducts directing ambient air to the full frontal area of the radiator, such ducts being disposed normally at about 90° to each other and converging towards the whole heat-exchanging area of the radiator. The particular arrangement of the present invention prevents direct hit to the radiator frontal area, and it further contemplates that the inlet to the air ducts be protected by screens for preventing grenades and other objects from being dropped into the ducts.

BRIEF DESCRIPTION OF THE DRAWING

Several objects and advantages of the present invention will become apparent to those skilled in the art when the following description of the best mode contemplated for practicing the invention is read in conjunction with the accompanying drawing, wherein:

FIG. 1 is a partial front perspective view of an armored car provided with a radiator air inlet according to the present invention;

FIG. 2 is a front elevation view thereof; and

FIG. 3 is a longitudinal section along line 3-3 of FIG. 2.

DETAILED DESCRIPTION OF THE PREFERRED EMBODIMENTS

As shown at FIGS. 1-2, an armored car 10 has an engine compartment or hood 12 made of armor plate steel panels welded together at their edges so as to form an armor plate enclosure for the sides and top of an internal combustion engine.

The engine compartment or hood 12 has a hinged top panel or access hatch 14, which is normally latched or locked shut but which, when open, permits to gain access to the interior of the engine compartment for repair and maintenance of the engine.

The engine compartment or hood 12 is formed of a pair of side panels 16, a top panel 18, the latter provided with an appropriate aperture normally obturated by the access door hatch 14, and a front panel 20. As best shown at FIG. 3, the front panel 20 which, like the side and top panels 16 and 18, is made of armor steel, is provided with a cut-out portion 22 immediately behind which is mounted the radiator 24. The radiator 24 is of conventional honeycomb structure with a plurality of air cores through which ambient air is caused to flow, partly as a result of normal flow of air through the cores when the vehicle is in motion, and partly as drawn through the cores by a fan 26 driven from the flywheel of the internal combustion engine 28 mounted in the engine compartment 12, in a conventional manner.

The cooling air induction system 30 of the invention comprises a pair of inlet ducts 32 and 34, having their axes disposed at about 90° relative to each other, and directing ambient air over the full frontal area of the radiator 24 disposed behind the opening 22. The front wall of the upper air duct 32 is a rectangular plate 36 of armor steel, and the front wall of the lower duct 34 is a similar rectangular plate 38 of armor steel disposed approximately at a 90° angle relative to the plate 36. The plates 36 and 38 are welded together at their junction. A winch 40, forming no part of the present invention, is mounted within the V formed by the two plates 36 and 38. The side wall of each air duct is also made of an armor steel panel, such side panels being designated as panels 42 and 44, FIGS. 1 and 3, relative to the air duct 32 and as panels 46 and 48 relative to the lower air duct 34. A baffle plate 50, made of ordinary sheet steel, forms the upper wall of the upper air duct 32, and a baffle plate 52, also formed of ordinary sheet steel, forms the lower wall of the lower air duct 34. The rectangular inlet opening of the upper air duct 32 is covered by a large mesh screen 54, providing unhampered flow of air therethrough, but preventing hand grenades, for example, from being thrown into the duct inlet opening. Although not absolutely necessary, the inlet opening of the lower duct 34 may also be protected by a screen 56.

The upper edge of the inlet opening of the upper duct 32 is connected to the front of the engine compartment armor steel top panel 18 by means of a dome 58 made of three triangular welded together plates of ordinary sheet steel or, alternatively if so desired, of armor steel.

The vehicle illustrated in the drawing is also provided with a front bumper 60 mounted by means of removable clamps 62 on the end of a pair of mounting brackets 64 welded to the vehicle body or frame. The bumpers 60 are made of one or more leaves of spring steel that is also bulletproof.

The angled plates 36 and 38 are made of armor steel and the upper edge of the plate 36 and the lower edge of the plate 38 overlap respectively the upper edge and the lower edge of the opening 22. Thus the plates 36 and 38 effectively protect the radiator 24 against direct hit by projectiles such as bullets. The plates 36 and 38 being disposed at an angle to each other and at an angle to the axis of direction of normal travel of the vehicle 10, bullets aimed directly at the front of the vehicle are caused to impinge upon the plates 36 and 38 at an angle to their surface, rather than normal to their surface, such that they tend to ricochet. Any bullet passing through the inlet opening into the duct 32, fired along a substantially horizontal trajectory, passes through the sheet metal upper wall 50 of the duct, and either passes freely through the sheet metal of the dome 58, or is stopped by the armor steel front panel 20 or the engine compartment upper panel 18. In a similar manner, any bullet penetrating into the lower air duct 34, along a slightly downwardly inclined trajectory, will pass through the sheet metal lower wall duct panel 52, and be stopped by the armor steel engine compartment front panel 20. It is important that the upper duct front panel 50 and the lower duct front panel 52 be made of relatively soft sheet metal, so as to prevent ricochet of the bullets, passing through the inlet openings of the ducts, from a wall to another wall of the ducts.

If it is desired to screen the radiator 24 from direct firing from the top front of the vehicle, the dome 58 may be made of welded armor steel plates. Also, an armor steel baffle, as shown at 66 at FIG. 3, may be disposed across the upper air duct 32 welded to the inner face of the armor steel plate 36, such as to screen the radiator 24 from direct hit by bullets directed at a small downward angle through the duct inlet opening.

The radiator 24 is protected from side hits by the armor steel engine compartment enclosure 12 and by the sidewalls 42, 44, 46 and 48 of the air ducts 32 and 34, all made of armor steel plates.

It will be appreciated that, although described and illustrated in term of an air induction system for a water coolant radiator, the structure of the invention may be used as an air induction system for cooling oil radiators, hydraulic fluid radiators, electronic or electrical equipment, engine compartments and air cooled engines in armored cars, military vehicles and the like.

Having thus disclosed the present invention by way of a typical structural embodiment thereof, modification whereof will be apparent to those skilled in the art, what is claimed as new is as follows:

1. A cooling air induction system for the engine compartment of an armored car and like vehicle, said engine compartment being an enclosure made of armor steel plates and having at least a front panel, a top panel, and a pair of side panels, said air induction system comprising an opening in said front panel for the passage of air therethrough into said engine compartment, a pair of air ducts disposed with their longitudinal axes at an angle and converging toward said opening, a first exterior wall of said air ducts being formed by a pair of panels of armor steel plate arranged at an angle to each other and forming a shield overlapping at least a pair of opposite edges of said opening, a pair of opposite second and third exterior walls for each air duct, said opposite exterior walls being made of armor steel plate and extending each from proximate one of the other edges of said opening, and a fourth exterior wall for each air duct opposite to said first wall and extending from the inlet of said duct to the front armor steel plate panel proximate said opening, each of said fourth exterior walls being made of ordinary non-bullet-proof material.

2. The air induction system of claim 1 wherein at least the inlet of one of said air ducts is protected by a screen mounted across said inlet.

3. The air induction system of claim 1 wherein the inlets of said air ducts are disposed one above the other and further comprising a metallic dome covering the fourth exterior wall of the upper air duct.

4. The air induction system of claim 3 wherein said dome is made of armor steel plates.

5. The air induction system of claim 3 further comprising a baffle plate disposed transversely in said upper air duct, said baffle plate being made of armor steel and extending part of the way across said upper duct and being welded to the interior surface of said first exterior wall.

6. The air induction system of claim 1 wherein said pair of panels are welded together at a substantially right angle.

7. The air induction system of claim 6 wherein said air ducts are disposed on the front of an armored car and further comprising a winch mounted in the V formed by said angled panels.

8. The air induction system of claim 1 wherein a radiator is disposed in said engine compartment behind said opening.

9. The air induction system of claim 3 further comprising at least one bumper blade of bullet-proof steel mounted ahead of said pair of panels of armored steel arranged at an angle to each other.

* * * * *